United States Patent
Hermiz et al.

(10) Patent No.: US 11,422,913 B2
(45) Date of Patent: Aug. 23, 2022

(54) SYSTEMS AND METHODS FOR CLEANING A DISPLAY IN A VEHICLE

(71) Applicant: Ford Global Technologies, LLC, Dearborn, MI (US)

(72) Inventors: Sena Hermiz, Farmington Hills, MI (US); Erick Lavoie, Van Buren Charter Township, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/116,549

(22) Filed: Dec. 9, 2020

(65) Prior Publication Data
US 2022/0179767 A1 Jun. 9, 2022

(51) Int. Cl.
| | |
|---|---|
| *G06F 11/34* | (2006.01) |
| *G06F 11/30* | (2006.01) |
| *B60K 35/00* | (2006.01) |
| *G06F 3/04883* | (2022.01) |

(52) U.S. Cl.
CPC .......... *G06F 11/3438* (2013.01); *B60K 35/00* (2013.01); *G06F 3/04883* (2013.01); *G06F 11/3072* (2013.01); *B60K 2370/1438* (2019.05); *B60K 2370/178* (2019.05)

(58) Field of Classification Search
CPC ............. G06F 11/3438; G06F 3/04883; G06F 11/3072; B60K 35/00; B60K 2370/178; B60K 2370/1438
See application file for complete search history.

(56) References Cited

U.S. PATENT DOCUMENTS

| | | | |
|---|---|---|---|
| 9,381,812 B2 | 7/2016 | Gilling | |
| 2015/0015506 A1* | 1/2015 | Lares | G06F 3/04886 345/173 |
| 2015/0137944 A1* | 5/2015 | Fuerth | G06F 3/04886 340/5.85 |
| 2019/0001930 A1* | 1/2019 | Dellock | A61L 2/088 |
| 2020/0245900 A1* | 8/2020 | Douglas | A61B 5/746 |

FOREIGN PATENT DOCUMENTS

| | | |
|---|---|---|
| CN | 204348336 U | 5/2015 |
| CN | 109591767 A | 4/2019 |
| DE | 102018211251 A1 | 1/2020 |

OTHER PUBLICATIONS

NuShield Blog—"NuShield Films—Not Windex for Auto Repairs GPS Displays" NPL-1 Link: https://www.nushield.com/blog/auto-repair-gps-displays/, Sep. 9, 2016, Anti-Glare Screen Protector, Display Care and Maintenance, GPS Navigation, Motor Vehicle Navigation.

* cited by examiner

*Primary Examiner* — Andrea C Leggett
(74) *Attorney, Agent, or Firm* — Brandon Hicks; Eversheds Sutherland (US) LLP

(57) ABSTRACT

Systems and methods for managing a display cleaning system are provided. The system may include a touchscreen device having a display operatively coupled to a cleaning apparatus. The touchscreen device may include an algorithm for detecting when and how often to clean the display. For example, the algorithm may be executed to monitor touch events on the display, such that when a certain number of touch events are detected, it will determine that the screen needs to be cleaned. Thresholds for cleaning may be adjusted based on user input. The touchscreen device may be integrated, for example, in an autonomous vehicle.

17 Claims, 5 Drawing Sheets

SYSTEMS AND METHODS FOR CLEANING A DISPLAY IN A VEHICLE

BACKGROUND

In a ride-hail Autonomous Vehicles ("AVs"), there will be one or more entertainment screens to accommodate infotainment for multiple passengers. The screen(s) will be used by multiple riders to control vehicle functions such as music, climate, video playback, etc. The screen can also be used to enter a password or special code to unlock applications. A user's fingerprints may be left behind on the screen depending on what they had on their fingertips. This would lead to several issues with the perception of the screen cleanliness, transmission of diseases, and security concerns.

Moreover, in restaurants and/or airplanes, employees are required to walk around and clean the displays, e.g., entertainment consoles or tablets, which may be inefficient and require unnecessary use of chemicals. Physical devices are available for cleaning the display, but a method for determining when and how often the display should be cleaned is needed. It is with respect to these and other considerations that the disclosure made herein is presented.

DETAILED DESCRIPTION

Overview

Figure 1:
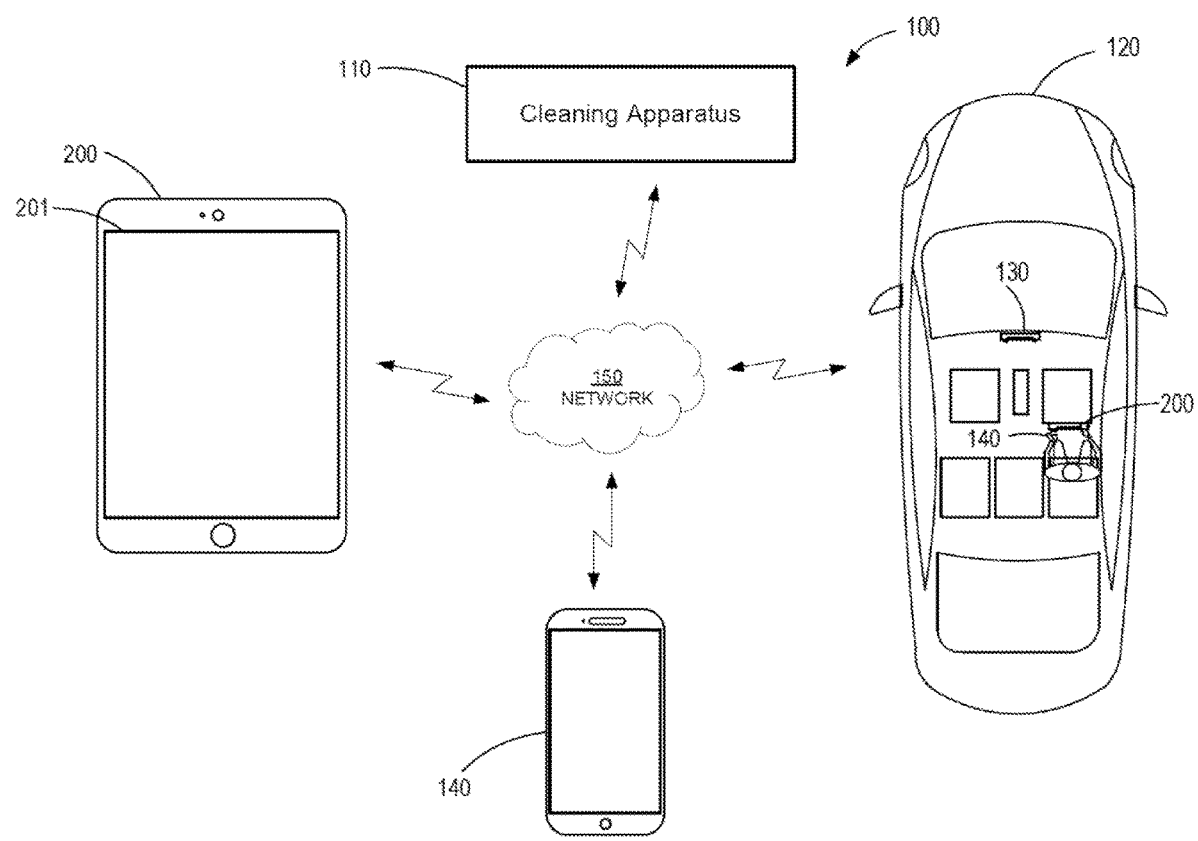
FIG. 1 illustrates a system for managing a display cleaning system in accordance with the principles of the present disclosure.

Systems and methods for managing a display cleaning system are provided. The system may include a touchscreen device having a display operatively coupled to a cleaning apparatus. In some instances, the touchscreen device may be integral to and disposed within a vehicle, which may be fully or partially autonomous and/or part of a ride hail service. The touchscreen device may include an algorithm for detecting when and how often to clean the display. For example, the algorithm may be executed to monitor touch events on the display, such that when a certain number of touch events are detected, it will determine that the screen needs to be cleaned. Thresholds for cleaning may be adjusted based on user input. The touchscreen device may be integrated, for example, in an autonomous vehicle. Detecting the need to clean the screen will result in less wear and tear since excessive cleaning will be eliminated. There will also be less exposure to chemicals to passengers, as well as less environmental consequences due to the reduction of chemicals.

In accordance with one aspect of the present disclosure, a method for managing a display cleaning system may include: detecting, by one or more sensors, one or more touch events on a display of the touchscreen device by a user; counting, by a processor, the one or more touch events, to determine a total number of touch events; determining, by the processor, whether the total number of touch events is greater than or equal to a predetermined threshold; and generating, by the processor, a cleaning alert if the total number of touch events is greater than or equal to the predetermined threshold. The cleaning alert may include a suggestion to clean the display at a later time. For example, the touchscreen device may be disposed within a vehicle, such that the cleaning alert includes a suggestion to clean the display when the user has left the vehicle.

The one or more touch events may include information indicative of at least one of amount of touch pressure, touch location, or touch duration. Moreover, the method further may include storing, by the processor, the information indicative of at least one of amount of touch pressure, touch location, or touch duration in a memory of the processor. Accordingly, the predetermined threshold may include a predetermined combination of at least one of amount of touch pressure, touch location, or touch duration. Moreover, the method may include causing, by the processor, a cleaning apparatus to clean the display if the total number of touch events is greater than or equal to the predetermined threshold.

The method further may include determining, by the processor, whether the user swiped the display based on the detected one or more touch events, as well as averaging, by the processor, a count of swiped pixels on the display, such that the total number of touch events includes the averaged count of swiped pixels.

In some embodiments, the method may include receiving, by the processor, information from a user device indicative of a health of the user; determining, by the processor, the health of the user based on the information received from the user device; and generating, by the processor, an alert if the health of the user is determined to be poor, wherein the cleaning alert comprises a suggestion to clean the display when the user has left the vehicle. For example, the information received from the user device may include information indicative of whether the user has been in contact with another person with poor health.

In accordance with another aspect of the present disclosure, a method for managing a display cleaning system may include: detecting, by one or more sensors, one or more touch events on a display of the touchscreen device by a user; determining, by a processor, whether the one or more touch events correspond with a passcode, the passcode configured to access an application of the touchscreen device; and generating, by the processor, a cleaning alert if the one or more touch events are determined to correspond with the passcode.

In accordance with another aspect of the present disclosure, a system for managing a display cleaning system is provided. The system may include a touchscreen device having a display, one or more sensors, the one or more sensors for detecting one or more touch events on the display, and a computing device having a processor and a memory. The memory may have computer executable instructions that, when executed by the processor, cause the processor to: count the one or more touch events to determine a total number of touch events; determine whether the total number of touch events is greater than or equal to a predetermined threshold stored in the memory; and generate a cleaning alert if the total number of touch events is greater than or equal to the predetermined threshold.

At least one of the one or more sensors may include a camera for detecting the one or more touch events on the display. In some instances, the camera may be integral to the touchscreen device. In other instances, the camera may be disposed within the vehicle and configured to monitor the screen of the touchscreen device. The system further may include a cleaning apparatus for cleaning the display of the touchscreen device, the cleaning apparatus operatively coupled to the computing device. For example, the cleaning apparatus may be a device that emits UV light and/or sprays and cleans the screen. In addition, the processor may instruct the cleaning apparatus to clean the display of the touchscreen device upon receipt of user input via the display by the user.

The system further may include a user device that may transmit information indicative of a health of a user, such that the processor further may: receive the information from the user device indicative of the health of the user; determine the health of the user based on the information received from the user device; and generate an alert if the health of the user is determined to be poor. In one embodiment, the system may include a control module of a vehicle operatively coupled to the user device, wherein the touchscreen device is disposed within the vehicle, such that the processor may receive the information from the user device indicative of the health of the user via the control module of the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, exemplary system 100 for managing a display cleaning system is provided. As shown in FIG. 1, system 100 may include touchscreen device 200 having display 201, cleaning apparatus 110, vehicle 120 having control module 130, and user device 140. Device 200 may include an algorithm for detecting when and how often to instruct cleaning apparatus 110 to clean display 201 of device 200, for example, when certain conditions, e.g., touch events, have been recorded by device 200 as described in further detail below. Additionally or alternatively, a user, e.g., passenger in vehicle 120, may initiate the cleaning of display 201 by cleaning apparatus 110, e.g., upon entry or exit of vehicle 120, via device 200 and/or user device 140.

Although cleaning apparatus 110 is shown in FIG. 1 as a separate component from device 200, cleaning apparatus 110 may be integrated with device 200 as a single component. For example, cleaning apparatus 110 may be built into device 200 and include, e.g., haptic/vibration modules configured to generate vibrations to clean device 200. Accordingly, the vibrations generated may dispel small dust particles and the like from device 200. Additionally or alternatively, cleaning apparatus 110 may include a source of UV light, such that cleaning apparatus may emit UV light to clean or otherwise disinfect display 201 of device 200. Moreover, cleaning apparatus 110 may include mechanical components such as a windshield wiper and disinfectant.

As shown in FIG. 1, touchscreen device 200 may be disposed in, or otherwise integrated with vehicle 120, such that one or more passengers may use device 200. In some embodiments, device 200 may be an infotainment console of vehicle 120, such that device 200 must be touched by a passenger to access the infotainment features, e.g., music player, videos, internet browser, map, etc. The infotainment console may include a combination of various entertainment devices (such as a radio, streaming audio solutions, and USB access ports for digital audio devices) with elements, such as a navigation system that provides navigation instructions and maps upon a display screen of the infotainment console. Accordingly, the one or more passengers may be required to touch display 201 of device 200 during the transit within vehicle 120 to access the applications therein, thereby smudging display 102 and/or potentially spreading bacteria and/or disease via display 201.

Vehicle 120 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, vehicle 120 may be a vehicle having a Level-4 or Level-5 autonomous vehicle controller.

In addition, user device 140, e.g., a mobile phone, may be carried by the passenger in vehicle 120. User device 140 may store information indicative of the passenger's health, in addition to the passenger's previous geographical location(s), e.g., via a GPS system integrated with user device 140. Additionally, user device 140 may transmit this information to device 200 directly, or via control module 130 of vehicle 130. For example, when the passenger enters vehicle 120, user device 140 may be operatively connected to control module 130, and control module 130, which may already be connected to device 200, may communicate the information received from user device 140 to device 200. Accordingly, control module 130 may learn that the passenger carrying user device 140 was recently in contact with an unhealthy person, e.g., via contract tracing, or in an unhealthy location based on the passenger's previous whereabouts, and/or that the passenger is currently unhealthy based on health information regarding the passenger stored on user device 140. Based on the passenger's unhealthy status, device 200 may instruct cleaning apparatus 110 to clean display 201 upon departure of the passenger from vehicle 120.

Touchscreen device 200 may communicate with cleaning apparatus 110, control module 130 of vehicle 120, and/or user device 140 over network 150. Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, e.g., Bluetooth Low Energy (BLE), cellular, near-field communication (NFC), WiFi, WiFi direct, machine-to-machine communication, man-to-machine communication, and/or visible light communications.

As will be understood by a person ordinarily skilled in the art, system 100 may include fewer or less components as shown in FIG. 1. For example, system 100 need not include vehicle 120 or user device 140, such that touchscreen device 200 may be disposed in another setting, e.g., airplane, movie theatre, restaurant, theme park, airport, or any other location where a touchscreen device may be used by the general public or an otherwise large group of people. Moreover, system 100 need not include cleaning apparatus 100, such that device 200 may generate an alert regarding a necessary cleaning, which may be performed manually by a person, e.g., the driver of the vehicle, a waiter, a steward, another employee, etc.

Figure 2:
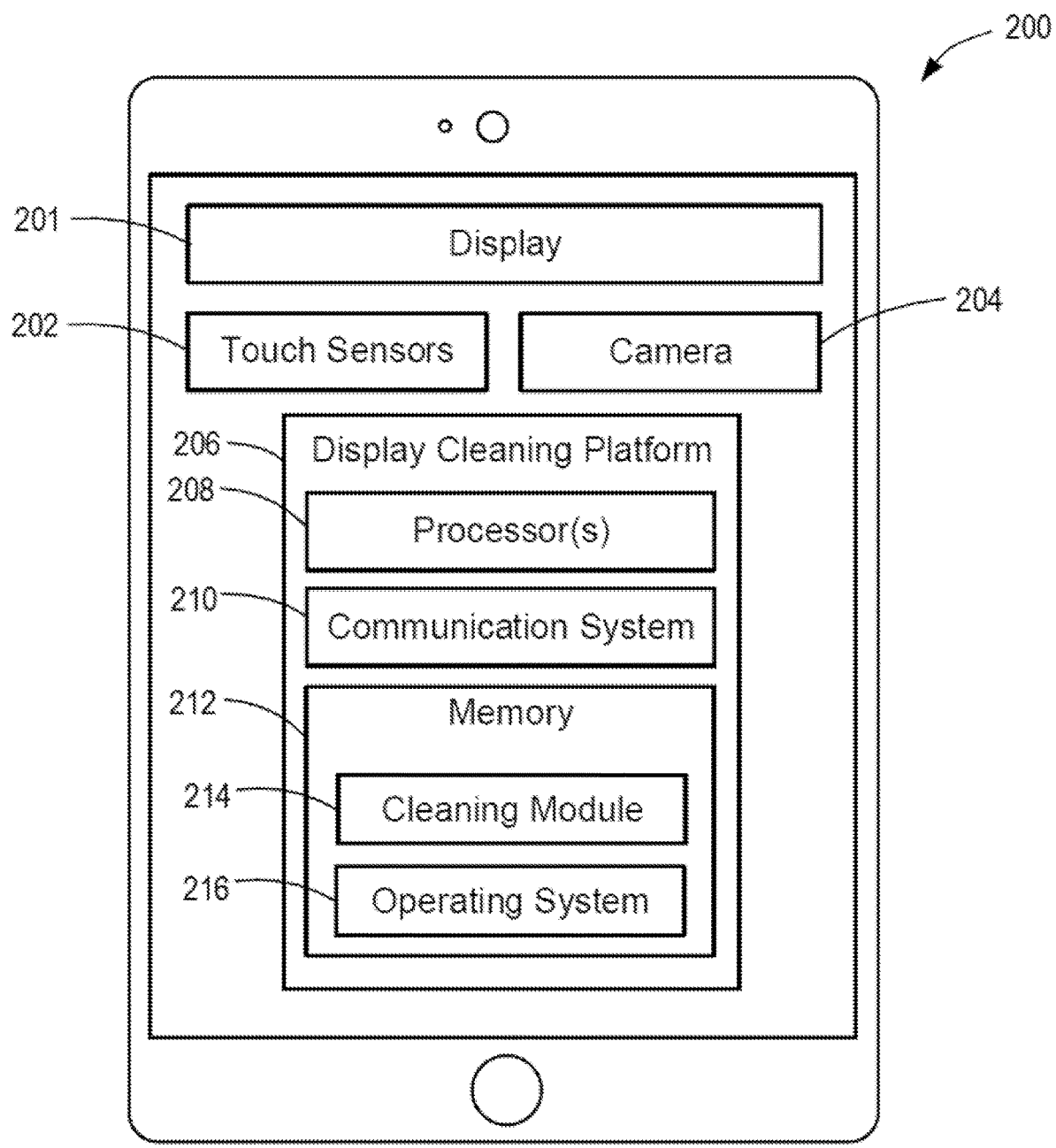
FIG. 2 shows some example components that may be included in a display in accordance with the principles of the present disclosure.

Referring now to FIG. 2, example components that may be included in touchscreen device 200 are described. Touchscreen device 200 may include display 201, one or more sensors, e.g., touch sensors 202 and/or camera 204, and display cleaning platform 206 having one or more processors 208, communication system 210, and memory 212. Touch sensors 202 may be integrated with display 201, and configured to detect when a user touches display 201, e.g., touch events, and generate a signal indicative of the touch events. The touch events may include touch information such as an amount of pressure exerted by the user on display 201 to register the touch, the location of the touch on display 201, e.g., which pixels of display 201 are touched, and the duration of a touch. Based on the touch events, touch sensors 202 may generate a signal indicative of the user swiping their finger across display 201. Camera 204 may also detect, e.g., record image data, when a user touches display 201, e.g., touch events, and generate a signal indicative of the touch events.

Communication system 210 may include a wireless transceiver that allows display cleaning platform 206 to communicate with cleaning apparatus 110, control module 130 of vehicle 120, and/or user device 140. The wireless transceiver may use any of various communication formats, such as, for example, an Internet communications format, or a cellular communications format.

Memory 212, which is one example of a non-transitory computer-readable medium, may be used to store operating system (OS) 216 and cleaning module 214. Cleaning module 214 may be provided in the form of computer-executable instructions, e.g., an algorithm, that may be executed by processor 208 for performing various operations in accordance with the disclosure. In addition, memory 212 may store predetermined touch event thresholds, such that the touch events detected by the one or more sensors may be compared with the predetermined touch event thresholds by processor 208 to determine whether a cleaning is necessary, as described in further detail below. For example, the predetermined touch event thresholds may include a touch pressure threshold, e.g., a collective maximum amount of pressure applied to display 201, a location threshold, e.g., a collective maximum number of pixels touched of display 201, a duration threshold, e.g., a collective maximum amount of time display 201 was touched, or any combination thereof. Moreover, the predetermined touch event thresholds may be adjusted by an operator of device 200.

Memory 212 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 212 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Cleaning module 214 may be executed by processor 208 for receiving touch event information from the one or more sensors, and determining whether to generate a cleaning alert and/or instruct cleaning apparatus 110 to clean display 201 of device 200. The cleaning alert may be a visual suggestion to clean display 201 that may be displayed on display 201 and/or control module 130 of vehicle 120. Additionally or alternatively, the cleaning alert may be an auditory alert. Accordingly, an operator of device 200 may, in response to the cleaning alert, manually clean display 201, e.g., by wiping display 201 with a disinfectant and cloth. Alternatively, cleaning module 214 may instruct cleaning apparatus 110 to conduct the cleaning of display 201. Cleaning module 214 may instruct cleaning apparatus 110 to conduct the cleaning of display 201 at a preselected time event, e.g., when a passenger exits vehicle 120. Thus, system 100 may include one or more sensors disposed in vehicle 120 for detecting the presence of the passenger within vehicle 120, e.g., seat sensors configured to detect passenger weight. Additionally or alternatively, image data generated by camera 204 may be processed by processor 208 to determine whether the passenger has exited vehicle 120.

Figure 3:
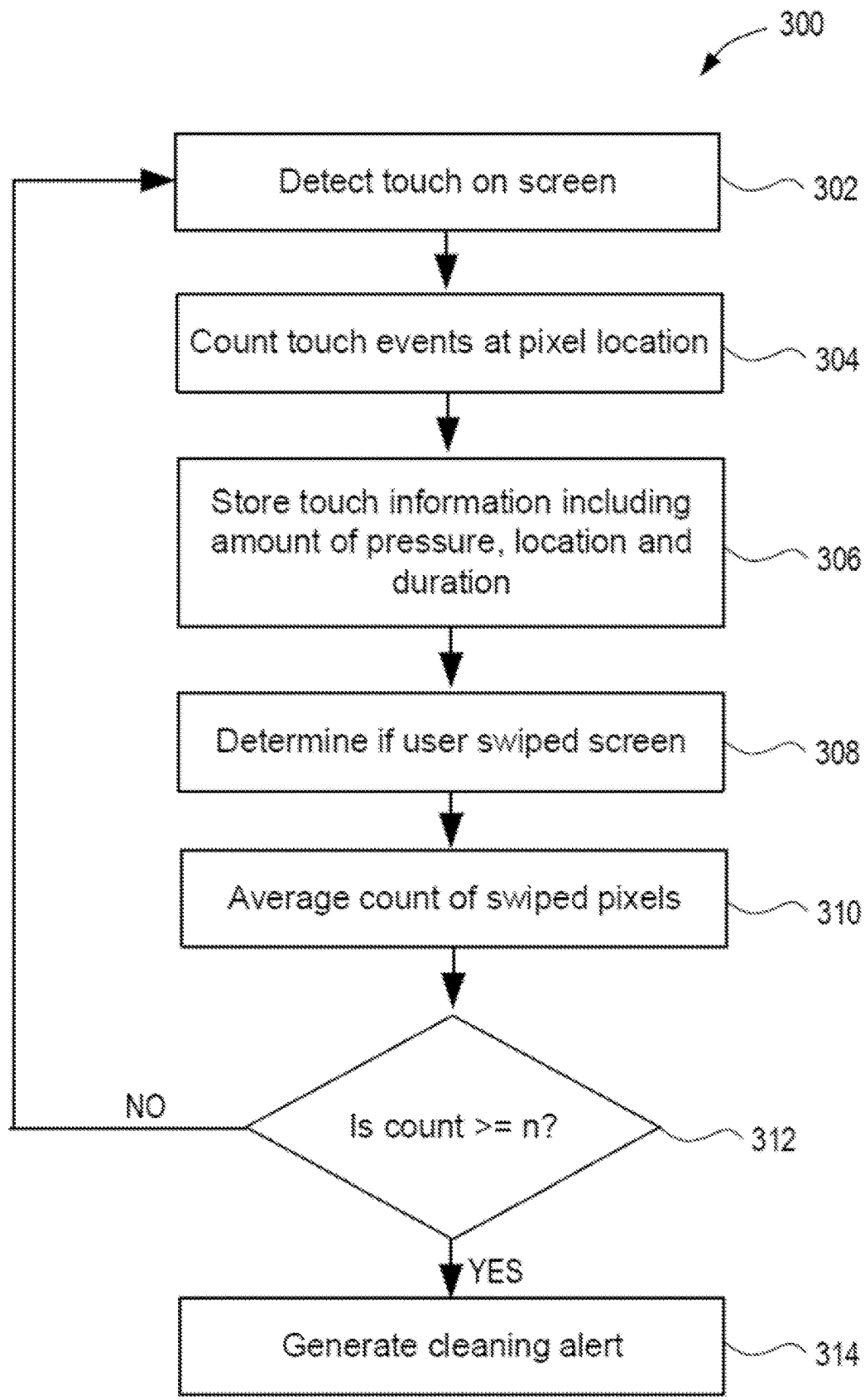
FIG. 3 is a flow chart illustrating steps for an exemplary method of managing a display cleaning system in accordance with the principles of the present disclosure.

Referring now to FIG. 3, exemplary method 300 for managing a display cleaning system is described. At step 302, touchscreen device 200 detects a user's touch on display 201, e.g., a touch event, via one or more sensors, e.g., touch sensors 202 and/or camera 204. For example, touch sensors 202 may detect the amount of pressure of the touch, the pixel location(s) on display 201 of the touch, and/or the duration of the touch. The sensors may generate a signal(s) indicative of the touch event, which is then received by processor 208 of device 200.

At step 304, processor 208 may count the touch events for a given pixel location of display 201. For example, if the user touches three pixels on display 201, processor 208 may count the number of pixels touched, e.g., three, as well as the amount of pressure applied at each pixel and how long the pixel was touched by the user. At step 306, the touch event information may be stored in memory 212. At step 308, processor 208 may determine whether the touch events received from the one or more sensors indicate that the user swiped the screen, e.g., touched display 201 at a first pixel location and dragging the touch across display 201 to a second pixel location a distance away from the first pixel location. If processor 208 determines that the user swiped the screen, at step 310, processor 208 may average the count of the swiped pixels. At step 312, cleaning module 214 may be executed by processor 208 to run the policy, e.g., determine whether the count is great than or equal to a predetermined threshold, e.g., "n" stored in memory 212. For example, "n" could represent a maximum number of touches detected on display 201, such that if processor 208 determines that the counted touch events reaches/exceeds "n", at step 314, processor 208 may generate a cleaning alert to notify an operator to that a cleaning procedure is necessary. Additionally or alternatively, processor 208 may instruct cleaning apparatus 110 to perform the cleaning procedure.

Figure 4:
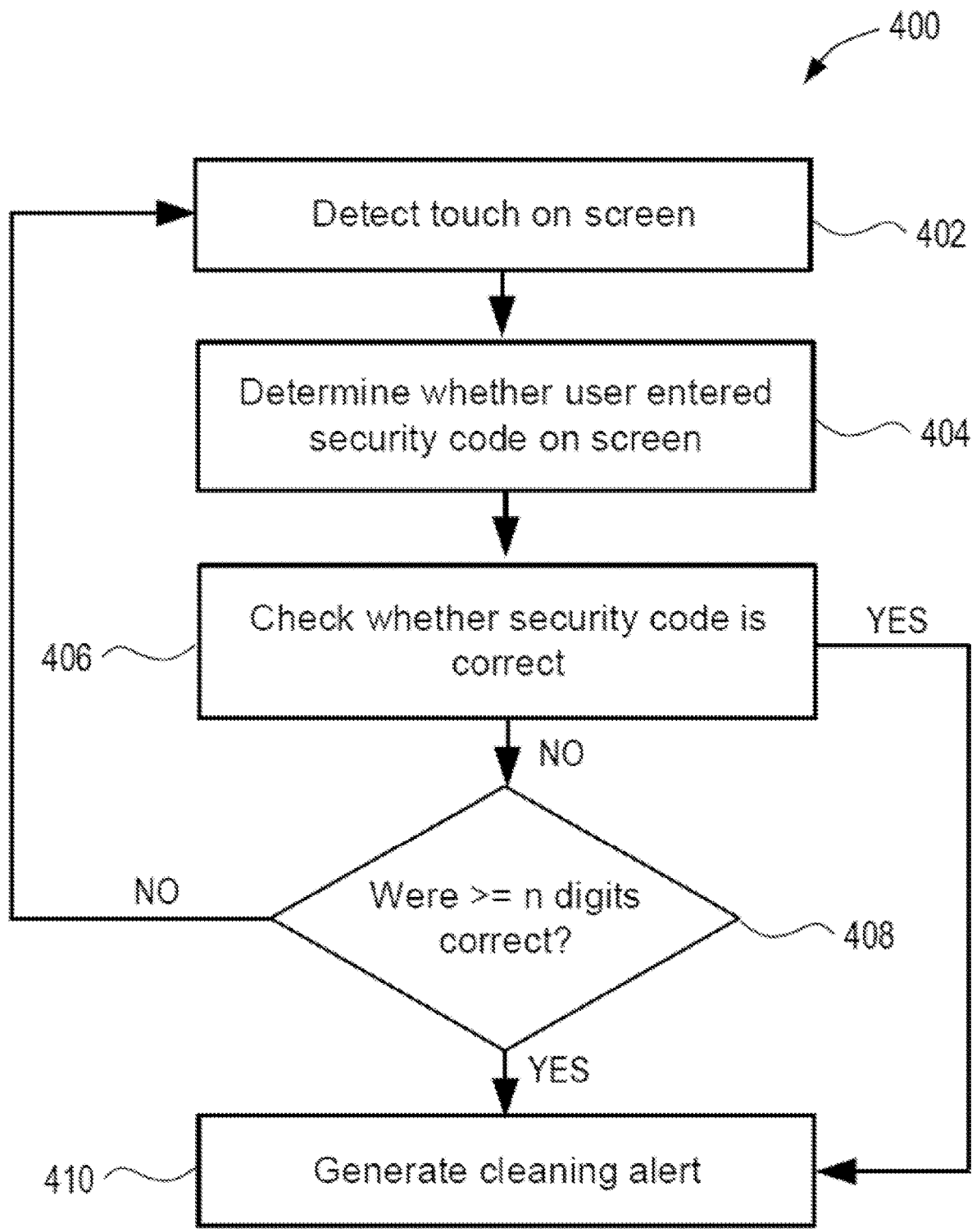
FIG. 4 is a flow chart illustrating steps for another exemplary method of managing a display cleaning system in accordance with the principles of the present disclosure.

Referring now to FIG. 4, exemplary method 400 for managing a display cleaning system to protect a user's passcode is described. At step 402, touchscreen device 200 detects a user's touch on display 201, e.g., a touch event, via one or more sensors, e.g., touch sensors 202 and/or camera 204. For example, touch sensors 202 may detect the amount of pressure of the touch, the pixel location(s) on display 201 of the touch, and/or the duration of the touch. The sensors may generate a signal(s) indicative of the touch event, which is then received by processor 208 of device 200.

At step 404, processor 208 may determine, based on the touch events received from the one or more sensors, whether the touch events indicate that the user is attempting to input a security code/passcode, e.g., to access an application of device 200. Accordingly, at step 406, processor 208 may check whether the security code was inputted correctly. If processor 208 determines that the security code was inputted correctly, method 400 may proceed to step 410, whereby processor 208 may generate a cleaning alert to notify an operator to that a cleaning procedure is necessary. Additionally or alternatively, processor 208 may instruct cleaning apparatus 110 to perform the cleaning procedure.

If, at step 406, processor 208 determines that the security code was inputted incorrectly, at step 408, processor 208 may count how many digits "n" of the attempted security code were correct, e.g., by comparing to an "n" threshold stored in memory 212. For example, the "n" threshold may be a percentage of digits of the total digits forming the security code. If the correct number of digits of the attempted passcode is less than the "n" threshold, method 400 may return to step 402. If the correct number of digits of the attempted passcode is greater than or equal to the "n" threshold, method 400 may proceed to step 410, whereby processor 208 may generate a cleaning alert to notify an operator to that a cleaning procedure is necessary. Additionally or alternatively, processor 208 may instruct cleaning apparatus 110 to perform the cleaning procedure.

Figure 5:
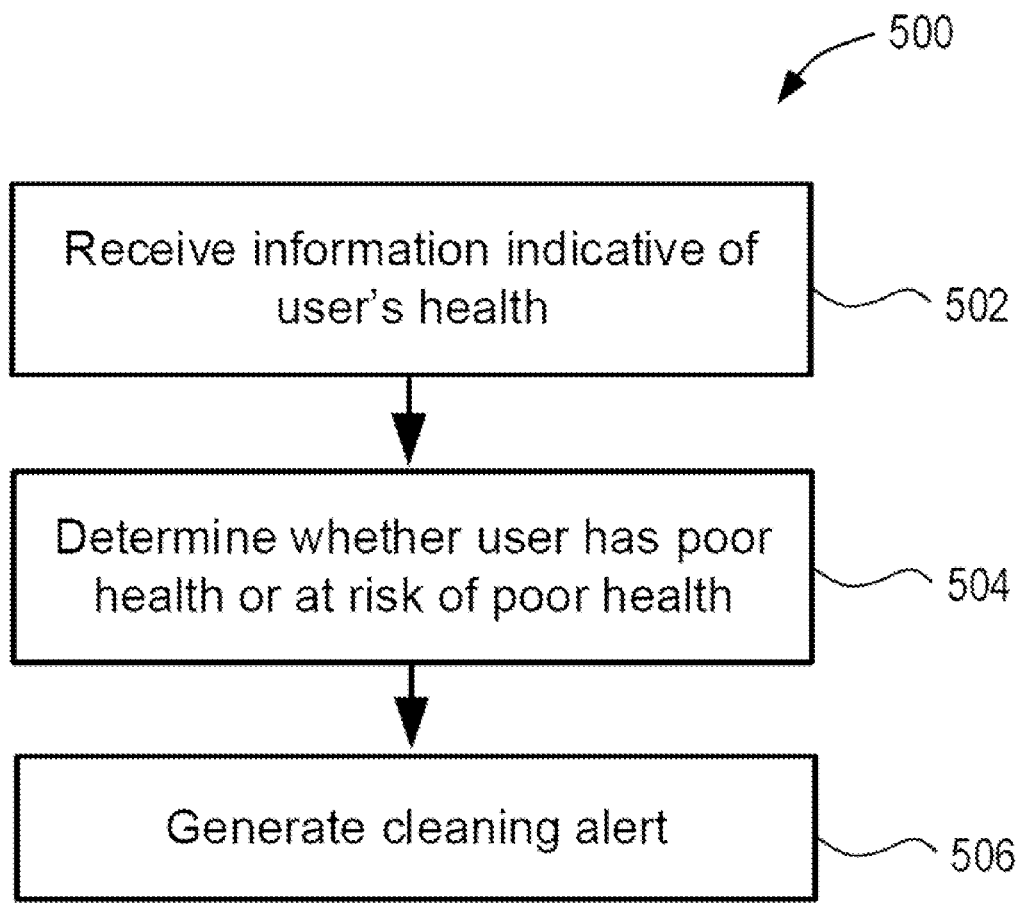
FIG. 5 is a flow chart illustrating steps for an exemplary method of managing a display cleaning system based on a user's health in accordance with the principles of the present disclosure.

Referring now to FIG. 5, exemplary method 500 for managing a display cleaning system based on a user's health is described. At step 502, user device 140, e.g., the passenger's mobile phone, may be operatively coupled to either control module 130 of vehicle 130 or directly to device 200, e.g., upon entry of vehicle 120, such that processor 208 of device 200 may receive information indicative of the passenger's health from user device 140, in addition to the passenger's previous geographical location(s), e.g., via a GPS system integrated with user device 140. At step 504, processor 208 may determine whether the passenger has poor health or is at risk of having poor health, e.g., the passenger carrying user device 140 was recently in contact with an unhealthy person, e.g., via contract tracing, or in an unhealthy location based on the passenger's previous whereabouts, and/or that the passenger is currently unhealthy based on health information regarding the passenger stored on user device 140. At step 506, processor 208 generate a cleaning alert to notify an operator to that a cleaning procedure is necessary if the passenger's health is determined to be poor or at risk of being poor, e.g., upon departure of the passenger from vehicle 120. Additionally or alternatively, processor 208 may instruct cleaning apparatus 110 to perform the cleaning procedure.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A method comprising:
   detecting, by one or more sensors, one or more touch events on a display of a touchscreen device by a user, wherein the one or more touch events comprises information about a number of pixels touched, an amount of pressure applied at each pixel, and a duration that the each pixel is touched;
   counting, by a processor, the one or more touch events, to determine a total number of touch events;
   determining, by the processor, whether the total number of touch events is greater than or equal to a predetermined threshold;
   receiving, by the processor, information from a user device indicative of a health of the user, wherein the information from the user device comprises a location of the user device;
   determining, by the processor, the health of the user based on the information received from the user device; and
   generating, by the processor, a cleaning alert if the total number of touch events is greater than or equal to the predetermined threshold or if the health of the user is determined to be poor or likely to be poor.

2. The method of claim 1, further comprising storing, by the processor, the information about the number of pixels touched, the amount of pressure applied at the each pixel, and the duration that the each pixel is touched in a memory of the processor.

3. The method of claim 1, wherein the predetermined threshold comprises a predetermined combination of amount of touch pressure, touch location, and touch duration.

4. The method of claim 1, wherein the touchscreen device is disposed within a vehicle, and wherein the cleaning alert comprises a suggestion to clean the display when the user has left the vehicle.

5. The method of claim 1, further comprising determining, by the processor, whether the user swiped the display based on the detected one or more touch events.

6. The method of claim 5, further comprising averaging, by the processor, a count of swiped pixels on the display, and wherein the total number of touch events comprises an averaged count of swiped pixels.

7. The method of claim 1, further comprising causing, by the processor, a cleaning apparatus to clean the display if the total number of touch events is greater than or equal to the predetermined threshold.

8. The method of claim 1,
wherein the cleaning alert comprises a suggestion to clean the display when the user has left the vehicle.

9. The method of claim 1, wherein the information received from the user device further comprises information indicative of whether the user has been in contact with another person with poor health.

10. A method comprising:
detecting, by one or more sensors operatively coupled to a touchscreen device, one or more touch events on a display of the touchscreen device by a user, wherein the one or more touch events comprises information about a number of pixels touched, an amount of pressure applied at each pixel, and a duration that the each pixel is touched;
determining, by a processor operatively coupled to the touchscreen device, whether the one or more touch events correspond with a passcode, the passcode configured to access an application of the touchscreen device;
receiving, by the processor, information from a user device indicative of a health of the user, wherein the information from the user device comprises a location of the user device;
determining, by the processor, the health of the user based on the information received from the user device; and
generating, by the processor, a cleaning alert if the one or more touch events are determined to correspond with the passcode or if the health of the user is determined to be poor or likely to be poor.

11. A system comprising:
a touchscreen device comprising a display;
one or more sensors configured to detect one or more touch events on the display;
a user device configured to transmit information indicative of a health of a user, wherein the information comprises a location of the user device; and
a computing device comprising a processor and a memory having computer executable instructions that, when executed by the processor, cause the processor to:
count the one or more touch events to determine a total number of touch events, wherein the one or more touch events comprises information about a number of pixels touched, an amount of pressure applied at each pixel, and a duration that the each pixel is touched;
determine whether the total number of touch events is greater than or equal to a predetermined threshold stored in the memory;
receive the information from the user device indicative of the health of the user;
determine the health of the user based on the information received from the user device; and
generate a cleaning alert if the total number of touch events is greater than or equal to the predetermined threshold or if the health of the user is determined to be poor or likely to be poor.

12. The system of claim 11, wherein the predetermined threshold comprises a predetermined combination of amount of touch pressure, touch location, and touch duration.

13. The system of claim 11, wherein at least one of the one or more sensors comprises a camera configured to detect the one or more touch events on the display.

14. The system of claim 11, further comprising a cleaning apparatus configured to clean the display of the touchscreen device, the cleaning apparatus operatively coupled to the computing device.

15. The system of claim 14, wherein the cleaning apparatus comprises a device configured to emit UV light.

16. The system of claim 14, wherein the processor is configured to instruct the cleaning apparatus to clean the display of the touchscreen device upon receipt of user input via the display by the user.

17. The system of claim 11, further comprising a control module of a vehicle operatively coupled to the user device, wherein the touchscreen device is disposed within the vehicle, and wherein the processor is configured to receive the information from the user device indicative of the health of the user via the control module of the vehicle.

* * * * *